Aug. 27, 1968  J. PRAGLIN ET AL  3,399,348
R.M.S. METERING SYSTEM
Filed April 8, 1964
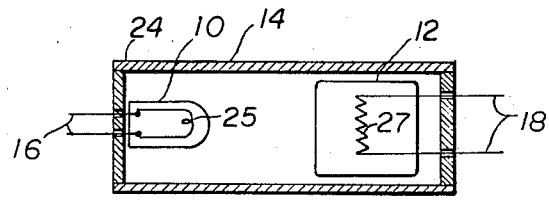
FIG. 1
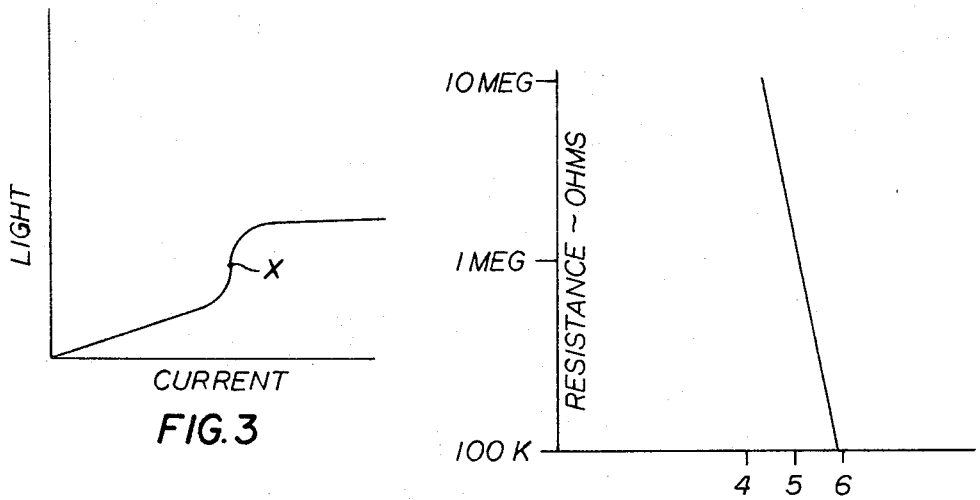
FIG. 3
FIG. 2
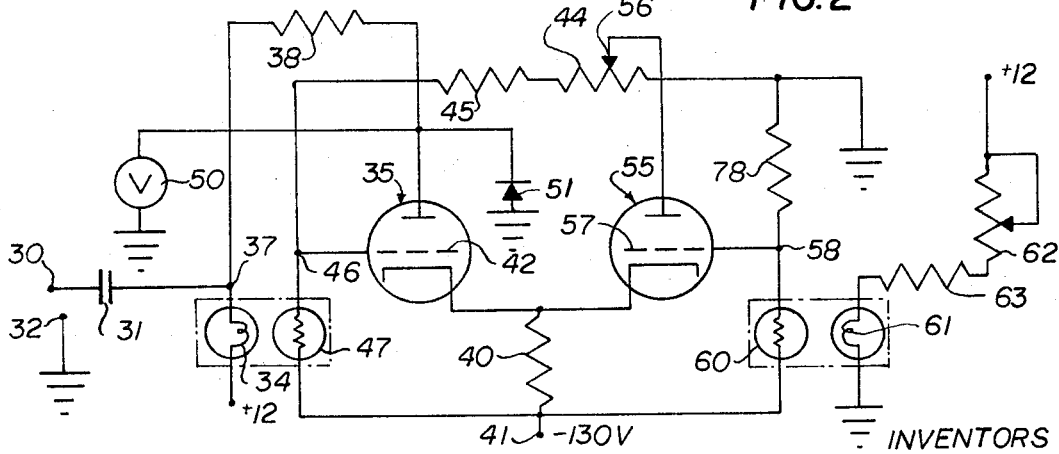
FIG. 4
INVENTORS
JULIUS PRAGLIN
RONALD F. SHUSTER
THOMAS J. NOVESKE
William David
Hoffmann & Yount
ATTORNEYS United States Patent Office 3,399,348
Patented Aug. 27, 1968

3,399,348
R.M.S. METERING SYSTEM
Julius Praglin, Beachwood, Ronald F. Shuster, Mentor, and Thomas J. Noveske, Seven Hills, Ohio, assignors to Keithley Instruments, Inc., Cleveland, Ohio, a corporation of Ohio
Filed Apr. 8, 1964, Ser. No. 358,348
3 Claims. (Cl. 324—96)

ABSTRACT OF THE DISCLOSURE

The present R.M.S. metering system comprises a first filament connected to a D.C. power supply and adapted to be connected to the A.C. signal source which is to be measured. The light radiated by this filament energizes a first photoresistor connected to a first amplifier which maintains constant the total current through the first filament. A meter is coupled to this amplifier to indicate the R.M.S. value of the A.C. input signal to the first filament. The first amplifier is connected in a differential amplier circuit which has a similar combination of a second amplifier, photoresistor, and a filament energized by the same D.C. source. The second amplifier compensates for variations in the D.C. power supply or the ambient temperature so that these do not affect the operation of the first amplifier.

---

This invention relates to electrical meter systems and, more particularly, to meter systems for measuring root mean square or alternating current power.

Priorly, numerous meter systems have been employed to measure electrical power and specifically to measure root mean square or effective alternating current power. For example, it is known in the art to employ thermocouples to measure power. It is also known to employ thermocouples in a meter system in which provision is made for feeding back energy from one part of the meter system to another part to improve the accuracy of the meter system. Thermocouple systems, however, exhibit certain disadvantages. For example, they constitute a relatively low gain arrangement in which extensive amplification is required more accurately to measure the power from the circuit being tested. Further, the sensitivity of these thermocouple meter systems is dependent upon the sensitivity of the thermocouple unit. Another of the disadvantages of thermocouples is that of dealing with ambient heat. Because thermocouples operate on a heat transfer principle, any ambient heat causes the generation of an error signal, which error signal is added to the signal generated from the circuit being measured and thus causes an error in the reading of the associated meter. Still other disadvantages of these prior art systems include the requirement of complex arrangements employing choppers to convert the direct current signals to alternating current signals so that they can be amplified by alternating current amplifiers. Generally, the amplified signal is connected to a direct current amplifier to actuate the meter movement.

An important object of the present invention is to provide a new and improved metering system for measuring the R.M.S. value of an alternating current signal in which the signal is applied to a radiation-emitting device connected into a direct current biasing circuit which operates to maintain the radiation from the device constant.

Another object of the present invention is to provide a new and improved metering system in which an alternating current signal is measured by measuring the effect of the signal on a radiation-emitting device.

A further object of the present invention is to provide a metering system as in the next preceding object wherein the radiation-emitting device is a tungsten filament.

It is another object of the present invention to provide an improved device for detecting power in a circuit, which detecting device is electrically isolated from the circuit in which power is being measured.

It is still a further object of this invention to provide a power-detecting device and a meter system therefor which reduces the ambient heat problem prevalent in other types of devices.

Briefly, in accordance with aspects of this invention, a device is provided for detecting power in a circuit, which device includes a radant energy source connected in the circuit in which power is to be measured and a radiant energy-responsive device operatively coupled or positioned to receive radiant energy from the source and which preferably operates to maintain the radiation from the source at a constant level. According to one of the features of the invention, the source is a tungsten filament lamp which is biased to operate in a range which provides a large gain for the system, the response of the system being a logarithmic function of the alternating current signal being measured. Such a device exhibits an exceedingly high gain in comparison to prior art systems. For example, in one illustrative embodiment of meter system employing this power-detecting device, a linear gain was obtained in the order of $10^{12}$.

In accordance with another illustrative embodiment of this invention, a meter system is provided with a pair of radiant energy sources each operatively coupled to one of the responsive devices and the system includes provision for feeding back energy in one portion of the system containing one of the responsive devices to another portion of the system containing the other responsive device and the system includes means for controlling the amount of energy fed back so that the meter operatively associated with the second portion of the circuit can be adjusted to zero. This meter system provides a nulling arrangement in which the system response is independent of the quiescent response of the power-responsive device, particularly the response of the device to the power applied to the source from an external circuit.

These and various other objects and features of the invention will be more clearly understood from a reading of the detailed description of the invention in conjunction with the drawings in which:

FIG. 1 is a combined pictorial and schematic diagram of one illustrative embodiment of a power-detecting device;

FIG. 2 is a plot on a log-log scale of current as abscissa versus the resistance of the energy-responsive device as ordinates illustrating the response of the circuit of FIG. 2;

FIG. 3 is a plot showing the current versus radiation characteristics of a tungsten filament; and FIG. 4 is a combined pictorial and schematic diagram of a preferred embodiment of a meter system employing pairs of devices of the type shown in FIG. 1.

Referring now to FIG. 1, there is depicted a light bulb or other radiant energy source 10 and a radiant energy-responsive device 12, such as a photoconductor or photocell, mounted in a suitable container 14 with only the leads 16 of the source 10 and the leads 18 of the device 12 projecting from the container 14. In the preferred embodiment of the present invention, the energy source 10 is a tungsten filament lamp and the radiant energy-responsive device may be a Clairex 603AL cell, which is a photoresponsive resistor. The container 14 preferably has inner walls having a high degree of reflectivity. The leads 16 are to be connected into the circuit in which power is to be measured and the electrical current flowing through these leads flows through the filament 25 to generate the other radiant energy, which energy is radiated to the photoresponsive device 12 which comprises a radiant energy-responsive variable resistance 27. The leads 18 of the photoresponsive device 12 are connected in a suitable circuit which responds to the variation in resistance of the resistor 27 to thereby give an indication of the power being dissipated in the filament 25.

In the preferred and illustrated embodiment of the present invention, a device corresponding to device shown in FIG. 1 is used in a circuit for measuring an alternating current signal. The alternating current signal to be measured is applied to input terminals 30, 32 of the circuit shown in FIG. 4. The terminal 30 is connected through a capacitor 31 to one side of a filament 34 which is connected in the load circuit of a triode 35. The filament 34 is in the anode circuit of the tube 35 and is part of the circuit connecting the anode to the positive side of the power supply which is above ground. The circuit includes the filament 34, which corresponds to the filament 25, a junction 37 to which the terminal 30 is connected, and a resistor 38 connected between the junction 37 and the anode of the tube 35. The cathode of the tube 35 is connected to the negative side of the power supply which is below ground through a cathode resistor 40. The other side of the power supply is indicated as being minus 130 volts in the drawing and as having a terminal 41. A biasing circuit for the grid 42 of the tube 35 is connected between ground and the terminal 41 and includes, proceeding from ground, a potentiometer-type resistance 44, a resistor 45, a junction 46 to which the grid 42 of the tube 35 is connected, and a photoresistor 47 connected between the junction 46 and the terminal 41. The described circuit operates to maintain a current of constant power through the filament 34. If the light radiated from the filament 34 increases, the resistance of the photoresistor 47 is decreased to cause the grid 42 of the tube 35 to become more negative with respect to the cathode and to decrease the current through the tube, which raises the voltage of the anode of the tube. The decrease in the current through the tube 35 causes the radiation from the filament 34 to decrease to compensate for the initial increase in radiation to thereby maintain the radiation at a constant level and the filament operating a predetermined point on its characteristic curve. It will be understood that if the radiation from the filament 34 should decrease, the tube would operate to increase the current flowing through the filament to, once again, bring the emission back to the proper point on the curve of the filament.

It will be noted that the voltage of the anode of the tube 35 varies in accordance with the amount of current which must be supplied by the tube to maintain the heating effect of the current in the filament 34 constant. Consequently, when an alternating current signal is applied to the terminals 30, 32, the change in the anode voltage of the tube 35 will be a function of the change in plate current, which in turn is a root mean square function of the magnitude of the alternating current signal. A meter 50 is connected between the anode and ground to indicate voltage of the plate of tube 35. The meter is protected from swings of the anode below ground by a diode 51.

The tube 35 is connected in a differential amplifier arrangement with a second tube 55. The tube 55 operates to provide a zero adjustment for the voltmeter 50 and also to minimize the effect of ambient temperature and power supply variations on the circuit. The tube 55 has its anode connected to a sliding tap 56 which is part of the potentiometer resistance 44 and its cathode connected to the positive side of the cathode resistor 40. The grid of the tube 55, designated by the reference numeral 57, is connected to a junction 58 between a resistor 78, which is connected to ground, and a photoresistor 60 which connects the junction 58 to the terminal 41 of the negative side of the power supply. The photoresistor 60 is subjected to radiation from a tungsten filament 61 energized by a circuit from the same power supply as that for energizing the filament 48 and including a resistor 62 and a resistor 63 connected in series with the power supply. The potentiometer resistance 62 may be adjusted to adjust the current through the filament 61 and this is preferably adjusted to an order of magnitude of approximately 5 milliamps. With the current at approximately this magnitude, the potentiometer slider 56 may be adjusted to effect a zero adjustment or reading on the voltmeter 50. If the current through the tube 55 increases, the voltage of the cathode of tube 55 and of tube 35 will increase and this causes the grid of tube 35 to be less positive relative to its cathode to decrease the current through the tube 35. And, conversely, if the current through the tube 55 decreases, the cathode of the tube becomes more negative, which also lowers the potential of the cathode of the tube 35, and the current in the tube 35 increases to decrease the potential of the anode of tube 35. The filament 61 will vary in emission in accordance with ambient and quiescent conditions in the same manner as the filament 34. Consequently, if the light emitted from the filaments 34, 61 should increase, the increased radiation from filament 61 will reduce the resistance of the photoresistor 60 to make the grid 57 of the tube 55 less positive with respect to its cathode to decrease the current through the tube 55 which, in turn, will operate to increase the current in the tube 35 to compensate for the decrease due to the increased emission from filament 34. Consequently, it can be seen that the differential amplifier arrangement operates to compensate for variation in quiescent and ambient current conditions.

In operation, the voltmeter 50 operates to indicate the voltage of the anode of tube 35 above ground and this voltage will be a function of the current flow through the tube. The voltmeter 50 is adjusted to read zero under quiescent conditions, i.e., the absence of the voltage signal at terminals 30, 32. The zero adjustment is obtained by adjusting the adjustable resistor 44 and the adjustable resistor 62, the latter adjustable resistance is set so that the radiation-emitting device 61 has a current of approximately 5 milliamps therethrough. After this is done, the resistor 44 is preferably adjusted to adjust the cathode potential of the tube 35 (by controlling the current through the tube 55 and the resistor 44) to provide a zero reading on the meter 50. At this point, the anode of tube 35 is at ground potential. When a signal is now applied to the input terminals 30, 32 of the system, the increase in radiation from the filament 34 will cause a decrease in the resistance of the photoresistor 47. This decrease in resistance will lower the potential of the grid 42 to raise the voltage of the anode of tube 35 and decrease the current through the tube 35 to compensate for the heating effect of the signal applied to the terminals 30, 32 to maintain the power dissipated in the filament 34 constant. The change in the voltage of the anode of the tube 35 will be indicated on the voltmeter 50 and this reading is a function of the power of the alternating current signal applied to the input terminals 30, 32. Consequently, the circuit will measure the R.M.S. value of the alternating current signal. Because of the high gain available, the system exhibits a very high sensitivity.

It will be understood that the words "light" and "photo" as used herein encompass wave radiations in both the visible and invisible range.

While we have shown and described certain illustrative embodiments of this invention, it is understood that the concept thereof may be applied to other embodiments without departing from the scope of this invention.

Having described our invention, we claim:

1. A system for measuring R.M.S. electrical power comprising first light energy source means, a direct current power supply, means for connecting said direct current power supply to said first source means, means for applying to said first source means an A.C. signal whose R.M.S. power is to be measured, a first light energy-responsive device responsive to said first source means, first amplifier means coupled to said first light energy-responsive device to amplify the latter's output signal, feedback means coupled between the output of said first amplifier means and said first light energy source means for supplying biasing current to the latter to maintain the power dissipated in the latter substantially constant, second light energy source means, means for connecting said direct current power supply to said second source means, a second light energy-responsive device operatively positioned to receive light from said second source means, second amplifier means coupled to said second light energy-responsive device to amplify the latter's output signal, means coupling said second amplifier means to said first amplifier means to produce an inverse response in said first amplifier means to the output of said second amplifier means so as to render the operation of said first amplifier means substantially independent of variations in said power supply, and meter means connected in circuit with said first amplifier means for indicating the R.M.S. power of the alternating current signal applied to said first source means.

2. The system according to claim 1 wherein said first amplifier means comprises an electron tube having at least three elements, said first radiant energy-responsive means is coupled between two of said elements to control the current flow through said electron tube, said second amplifier means comprises an electron tube having at least three elements, and said second radiant energy-responsive means is coupled between two of said elements of said second electron tube.

3. A system according to claim 1, wherein said first light energy source means is a tungsten filament, and the biasing current supplied by said feedback means to said filament maintains the latter on a steep portion of its light radiation versus current curve.

References Cited

UNITED STATES PATENTS 2,081,839   5/1937   Rankin _____ 324—96
3,213,364   10/1965   Miller _____ 324—106

OTHER REFERENCES

Photoelectric R-F Wattmeter, The Cornell-Dublier Capacitor, vol. 22, No. 7, July 1957, pp. 3–9.

RUDOLPH V. ROLINEC, *Primary Examiner.*

E. F. KARLSEN, *Assistant Examiner.*